United States Patent [19]

Sato

[11] 4,266,836

[45] May 12, 1981

[54] AUTOMOTIVE ASH TRAY ASSEMBLY

[75] Inventor: Fumiyoshi Sato, Sayama, Japan

[73] Assignee: Nissan Motor Company, Limited, Yokohama, Japan

[21] Appl. No.: 35,104

[22] Filed: May 1, 1979

[30] Foreign Application Priority Data

May 15, 1978 [JP] Japan .................................. 53-57879

[51] Int. Cl.³ .......................... B60N 3/08; A47B 88/00
[52] U.S. Cl. .................................. 312/246; 312/242; 312/332; 312/348
[58] Field of Search ................ 312/242, 246, 319, 330, 312/332, 348; 308/3.6, 3.8

[56] References Cited

U.S. PATENT DOCUMENTS

| | | | |
|---|---|---|---|
| 3,355,232 | 11/1967 | Blake | 312/242 |
| 3,600,051 | 8/1971 | DeBoer | 312/242 |
| 3,738,725 | 6/1973 | Visser | 312/246 |

Primary Examiner—Casmir A. Nunberg

[57] ABSTRACT

Ash tray assembly comprising an ash receptacle, a stationary cover, a guide track of limitedly resilient material pivotally carried by the cover, a guide follower integral with the ash receptacle slidably received by the guide track and having a stop member cooperating with a part of the cover for limiting the slide movement of the ash receptacle, said guide track having two resilient extensions abutting against the adjacent wall of the cover to achieve stable slide movement of the ash receptacle. The ash receptacle can be detached from the cover by limited pivotal movement thereof.

3 Claims, 8 Drawing Figures

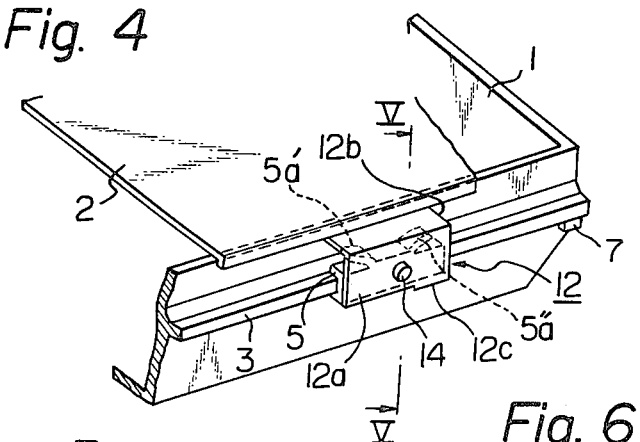
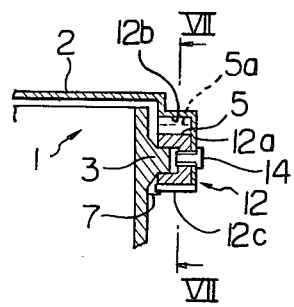
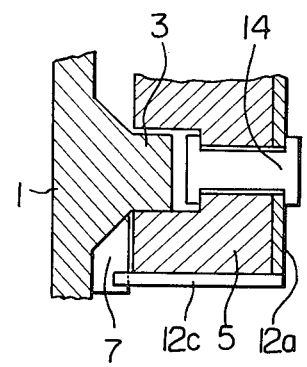
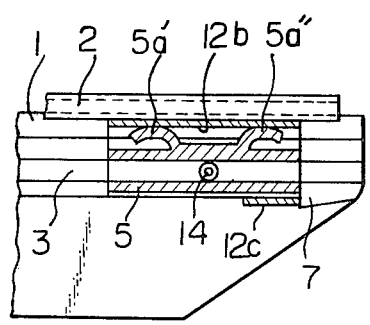
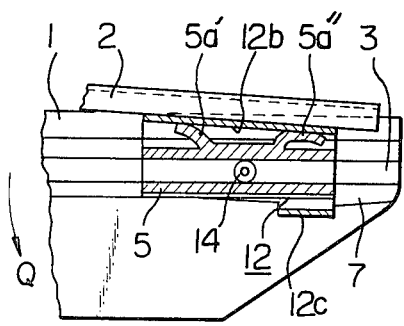

AUTOMOTIVE ASH TRAY ASSEMBLY

BACKGROUND OF THE INVENTION

This invention relates to an improved ash tray assembly particularly for motor vehicles. Automotive ash trays generally known and used comprise box-shape ash receptacles and stationary covers slidably carrying the ash receptacles. Each ash receptacle carries on both its side walls ribs serving as slide members which are slidably fitted within guide tracks attached to the cover. Usually provided is a wire spring having one end fixed to the inside of the ash receptacle and the other, elongate end bent toward the underside of the cover. This end of the wire spring is in pressure engagement with the underside of the cover. The frictional engagement of the spring against the cover holds the relative positions of the ash receptacle and the cover substantially correct and stabilizes the pushing and drawing movements of the ash receptacle along the guide track.

However, this wire spring at the same time hinders complete withdrawal of the ash receptacle out of the cover, for clearing ash and cigarette butts in the ash receptacle. One has to depress the wire spring with one hand while drawing the ash receptacle out of the cover with the other hand. This procedure is not only troublesome but also makes the operator's hand dirty.

OBJECTS OF THE INVENTION

It is therefore a primary object of the invention to provide an improved ash tray assembly particularly for motor vehicles in which an ash receptacle can be easily detached from a stationary cover and yet the pushing or drawing movement of the ash receptacle relative to the cover is smoothly and stably achieved.

Another object of the invention is to provide an improved ash tray assembly of the type mentioned above in which an ash receptacle together with a guide track for slide movement of the receptacle therealong is limitedly pivotal relative to the cover against one or more resilient members abutting against the cover wall, whereby the mere simple manipulation of the ash receptacle itself enables detaching of the ash receptacle from the cover.

Still another object of the invention is to provide an improved ash tray assembly of the type mentioned above which further comprises one or more stop members which prevent withdrawal of the ash receptacle from the cover during normal pushing or drawing movement while being released by pivotal movement of the ash receptacle to premit complete withdrawal of the ash receptacle from the cover.

Further objects of the invention are a minimum number of the constituent elements and greater facility in assembling procedure.

Other objects, features and advantages of the invention will be made clearer as the detailed explanation of the preferred embodiment of the invention hereinafter proceeds in comparison with a typical arrangement of prior art ash tray assemblies, reference being made to the accompanying drawings.

BRIEF DESCRIPTION OF THE DRAWINGS

FIG. 4 is a perspective view illustrating an ash tray assembly according to a single preferred embodiment of the invention;

FIG. 5 is a sectional view taken along the line V—V of FIG. 4;

FIG. 6 is an enlarged view of part of FIG. 5;

FIG. 7 is a sectional view taken along the line VII—VII of FIG. 5; and

FIG. 8 is a view similar to FIG. 7 but illustrating a different operating stage.

DETAILED DESCRIPTIONS OF THE PRIOR ART AND THE INVENTION

Figure 1:
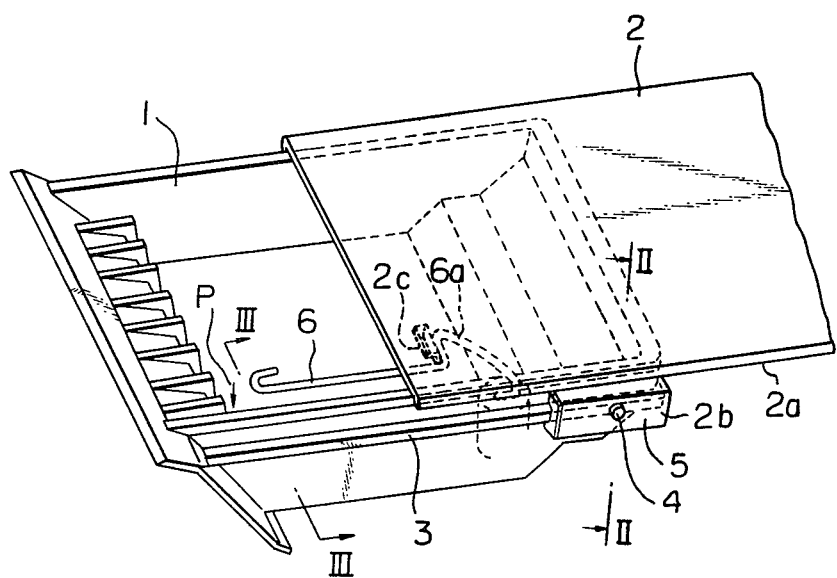
FIG. 1 is a perspective view illustrating a prior art ash tray assembly for motor vehicles.
Figure 2:
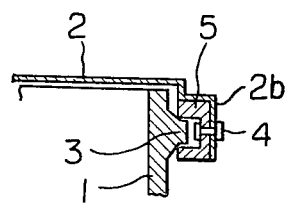
FIGS. 2 and 3 are respectively sectional views taken along the lines II—II and III—III of FIG. 1.

An ash tray assembly according to the prior art is first explained with reference to FIGS. 1 to 3. A generally box shape, upwardly open ash receptacle 1 has ribs 3 formed preferably on both side walls, which extend generally throughout the length of the ash receptacle 1. A stationary cover 2 includes an underside surface 2a covering the upwardly directed opening of the ash receptacle 1 and guide track supports 2b, preferably two, formed by downward extension of part of the cover surface 2a. A channel profiled guide track 5, preferably of plastics, is fitted in each guide track support 2b by bolting or other means 4. The ribs 3 forming guide following slide members are slidably received in the channels of the guide tracks so that the ash receptacle is slidingly drawn or pushed along the guide tracks 5.

A wire spring 6, as previously mentioned, has one end fixed to the base of the ash receptacle 1, for instance by embedding that end in a projection provided on the base. The wire spring is bent at its intermediate portion 6a and curved like hair pin toward the cover surface 2a. The bent portion 6a of the wire spring is hooked on a stop projection 2c provided, for instance, by a rectangular piece bonded or likewise fastened to the cover ceiling 2a. Thus, the wire spring rubs against the cover surface as the ash receptacle moves back and forth along the guide tracks 5.

Figure 3:
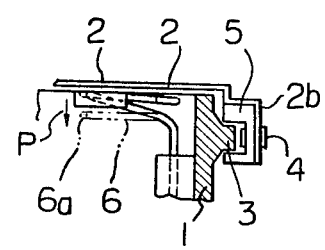

In order to detach the ash receptacle 1 from the cover 2 for instance for discharging ash, the wire spring 6 must be depressed in the direction indicated by P to a position indicated by a phantom line in FIG. 3, disengaging the bent portion 6a out of the stop projection 2c. Then the ash receptacle 1 can be detached by completely withdrawing the ribs 3 from the guide tracks 5. Compressing the spring must be undesirably made by operator's hand as briefly mentioned before.

The invention proposes an improved ash tray assembly which is free from this and other defects and is easier and more convenient to be handled. Reference is now made to FIGS. 4 to 8.

The ash tray assembly according to the invention, comprises a box shape ash receptacle 1 and a cover 2, details of which are as in the prior art example. The ash receptacle 1 has elongate ribs 3 formed preferably on both side walls. The ribs 3 extend substantially throughout the length of the ash receptacle 1 and have abutment pieces 7 projecting from the rear ends thereof.

A guide track support 12 for each rib 3 is formed by a channel profiled member as a partial downward extension of the cover 2. Likewise channel profiled guide track members 5 made of limitedly resilient material, preferably plastics, are fitted in the channels of the guide track supports 12 at a certain space from the top wall 12b of the guide track support 12. A bottom 12c of the guide track support is shortened to cover only the rear part of the guide track 5, while it extends laterally somewhat inwardly beyond the inner edge of the top wall 12b of the guide track support. The bottom 12c cooperates with the abutment pieces 7 to prevent undesired withdrawal of the ash receptacle 1 from the cover 2 during normal sliding movement thereof.

The guide track 5 and the guide track support 12 are joined together by means of a pivot pin 14 extending inwardly through the side wall 12a of the guide track support so that the guide track 5 is limitedly pivotal about the axis transverse to the direction of slide movement of the ash receptacle within the guide track support 12. The rib 3 is slidably received in the channel of the guide track 5 at a small clearance from the inner end of the pivot pin 14.

As best seen in FIG. 7, leaf-like, resilient biasing members 5a' and 5a'' are formed preferably as a single piece with the guide track member 5. The resilient members extend through the space between the guide track and the guide track support upwardly and transversely outwardly from each other and resiliently abut against the top wall 12b of the guide track support. These members prevent pivotal movement of the ash receptacle and stabilizes the normal slide movement thereof, while being yieldable to permit a desired pivotal movement of the ash receptacle, as will be further described.

When handling the ash tray assembly arranged as above, as the ash receptacle 1 is drawn forwardly toward the vehicle passenger, the ribs 3 slide alone the guide tracks 5 until the abutment pieces 7 at the rear ends of the ash receptacle 1 abut against the bottoms 12c of the guide track supports. The ash receptacle can then be no longer drawn out.

When detachment of the ash receptacle 1 from the cover 2 is desired, the front of the ash receptacle 1 is angularly moved in the direction indicated by an arrow Q in FIG. 7 or in the counter-clockwise direction. Then, the guide track 5 together with the ribs 3 is pivoted in the same direction about the pivot pin 14 so that one 5a'' of the resilient members to the right of FIG. 7 yields, while the other resilient member 5a' is relieved of pressure contact with the guide track support 12. The abutment projection 7 is then brought out of engagement with the bottom 12c of the guide track support 12. The ash receptacle 1 is thus easily slipped out of the cover 2.

The reverse procedure will put the ash receptacle to the former slidable position.

It would be readily understood that various design modifications are possible without departing from the basic concept of the invention: for instance the resilient members may be separate from the guide track and of other material such as metal; instead of ribs, channel grooves may be formed on the side walls of the ash receptacle and correspondingly, rib-shape guide tracks may be received in the channel grooves.

What is claimed is:

1. An ash tray assembly for motor vehicles comprising:
   a stationary cover having a horizontally disposed wall section and a vertically disposed side wall section;
   an ash receptacle slidable in relation to said cover and having a vertically disposed side wall section which has an elongated slide projection extending laterally outwardly toward said vertically disposed side wall section of said cover;
   a guide track member pivotally carried on said vertically disposed side wall section of said cover and having an axis of pivotal movement transverse to the direction of the sliding movement of said ash receptacle, said guide track member having an elongated guide channel which receives therein said slide projection of said ash receptacle so that said ash receptacle is slidable in relation to said cover;
   biasing means born between said cover and said guide track member to urgingly and yieldably hold said guide track member at a position thereof in which said guide channel longitudinally extends substantially parallel to said horizontally disposed wall section of said cover; and
   an abutment member in the form of a projection provided to said side wall section of said ash receptacle and releasably engageable with said horizontally disposed wall section of said cover to positively limit the extent of opening of said ash receptacle, the engagement of said abutment member with said horizontally disposed wall section of said cover being released by pivotal movement of said ash receptacle to permit removal of said ash receptacle from said cover.

2. An ash tray assembly as claimed in claim 1, in which said abutment member integrally formed with said side wall section of said ash receptacle adjacent one end of said side projection.

3. An ash tray assembly as claimed in claim 1, in which said cover further includes a horizontally disposed wall section above said first named horizontally disposed wall section, said guide track member being interposed between said first and second named horizontally disposed wall sections of said cover, and in which said biasing means includes two resilient leaf members integrally formed with said guide track member and extending, through the space between said second named horizontally disposed wall section of said cover and the upper face of said guide track member, upwardly and slantwise so as to increasingly apart from each other toward the upper ends thereof.

* * * * *